United States Patent [19]

Wareham

[11] Patent Number: 4,712,430
[45] Date of Patent: Dec. 15, 1987

[54] PRESSURE TRANSDUCER

[75] Inventor: William Wareham, Marion, Mass.

[73] Assignee: Dynisco, Inc., Norwood, Mass.

[21] Appl. No.: 918,087

[22] Filed: Oct. 14, 1986

Related U.S. Application Data

[63] Continuation-in-part of Ser. No. 848,300, Aug. 4, 1986.

[51] Int. Cl.⁴ .......................... G01L 7/08; G01L 9/04
[52] U.S. Cl. ........................................ 73/706; 73/720; 73/726; 338/4; 338/42
[58] Field of Search ................. 73/706, 726, 727, 720, 73/721; 338/4, 42

[56] References Cited

U.S. PATENT DOCUMENTS

| | | | |
|---|---|---|---|
| 2,979,680 | 4/1961 | Bean, Jr. | 73/720 |
| 3,303,451 | 2/1967 | Yuan | 73/720 |
| 3,678,753 | 7/1972 | Eggleston et al. | 73/726 |
| 4,570,498 | 2/1986 | Okayama | 73/726 |

*Primary Examiner*—Donald O. Woodiel
*Attorney, Agent, or Firm*—Wolf, Greenfield & Sacks

[57] ABSTRACT

A pressure transducer with a diaphragm coupler at one end and a sensing element at the other end connected by a capillary tube. The sensing element includes a cap member having a deformable surface including a top wall forming a thin diaphragm having a diametrically disposed raised beam extending across the top surface and having a gage received surface for receiving a plurality of strain gages. The deformable top wall surface has indentations therein on either side of and extending longtudinally of the raised beam to reduce tension forces across the diaphragm and improve linearity of the diaphragm.

28 Claims, 11 Drawing Figures

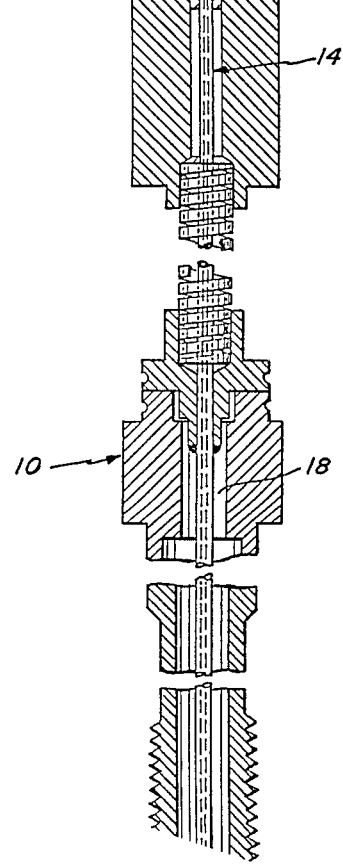
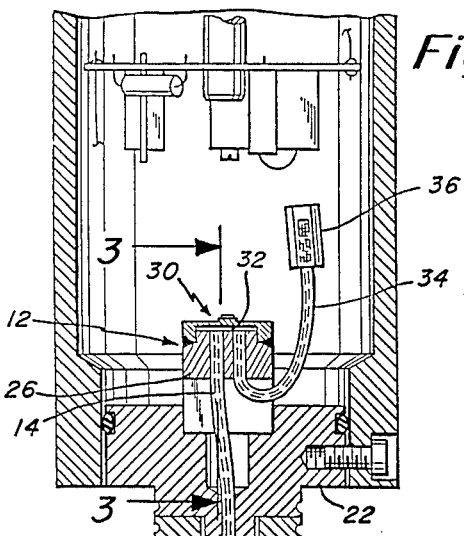
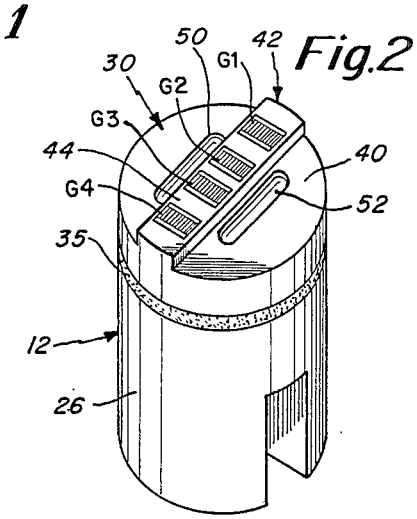

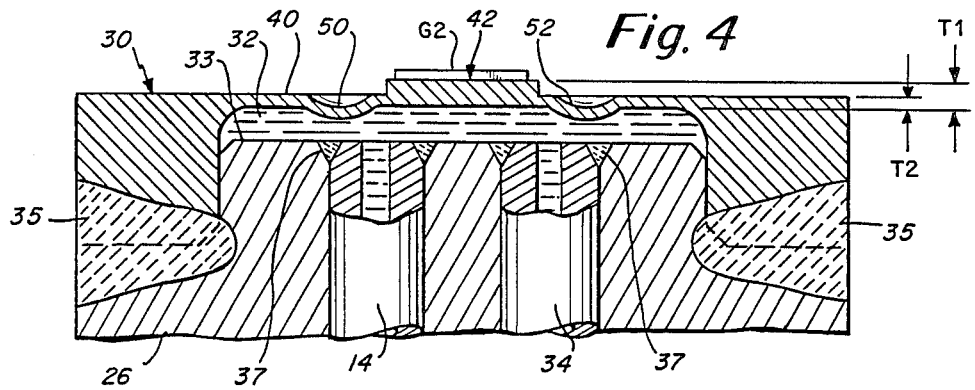
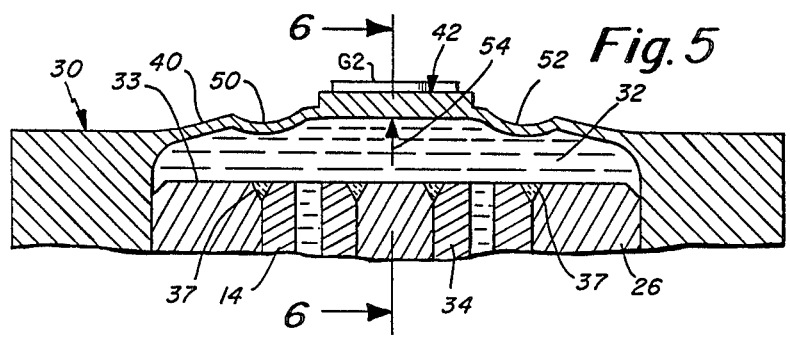
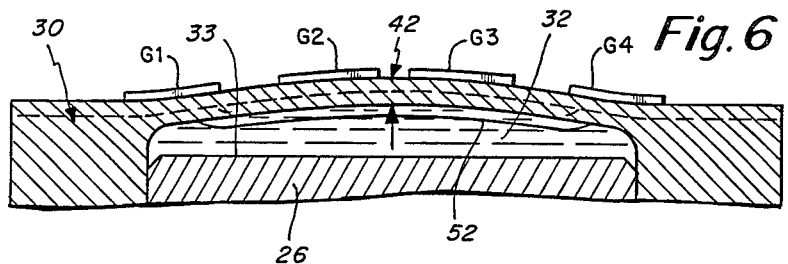
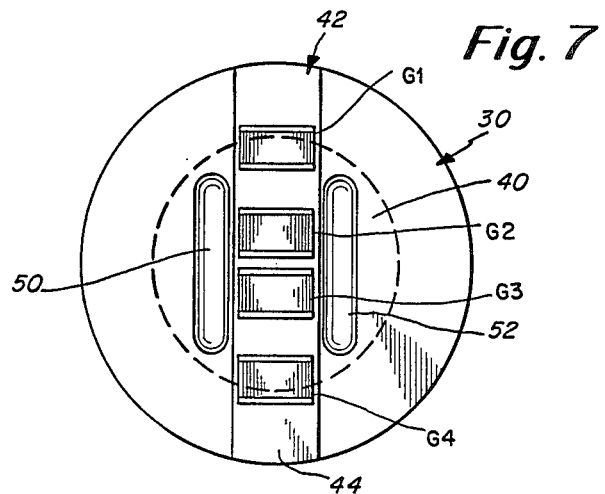

PRESSURE TRANSDUCER

RELATED APPLICATION

This application is a continuation-in-part application of Ser. No. 848,300 filed Aug. 4, 1986 and also entitled PRESSURE TRANSDUCER.

BACKGROUND OF THE INVENTION

The present invention relates in general to pressure transducers, and pertains more particularly to liquid-filled pressure transducers, such as pressure transducers of the type disclosed in U.S. Pat. No. 3,349,623 to Pastan issued Oct. 31, 1967, U.S. Pat. No. 3,678,753 issued to Eggleston, et al Jul. 25, 1972, and U.S. Ser. No. 848,300 to Wareham filed Apr. 4, 1986. Even more particularly, the present invention relates to relatively lower range melt pressure transducers.

As discussed in both the Pastan patent and the Eggleston, et al patent, fluid-filled pressure transducers are designed to be used in those systems in which it is undesirable for the medium whose pressure is being measured to enter into the instrument. In such cases, the instrument itself is filled with a fluid which is coupled by means of a diaphragm or some other device to the medium whose pressure is to be measured. The fluid which fills the instrument directly transmits the pressure of the medium to the sensing device. A typical fluid for the transducer is mercury.

The Eggleston, et al U.S. Pat. No. 3,678,753 described a pressure transducer that includes an elongated frame and a capillary tube extending through the frame and terminating at one end adjacent one end of the frame. A coupler closes that end of the frame and defines with the frame a chamber that is in communication with the capillary tube. The other end of the capillary tube communicates with a sensing device which has a small deflection throughout its full operative range. The sensing device is in the form of a deformable cap member having a recess therein, defining with a portion of the frame, a thin sensor compartment that is of disc-shape and is in communication with the other end of the capillary tube. A liquid, preferably mercury, fills the thin sensor compartment, chamber and capillary tube so as to transmit directly the pressure applied against the coupler to the sensing device to render a pressure measurement.

The Eggleston, et al pressure transducer is generally designed, however, for pressures down to about 1500 p.s.i. With this prior art transducer, pressures lower than 1500 p.s.i. are not effectively measured because the deflectable wall or diaphragm of the cap member has to be constructed too thin making the device quite susceptible to manufacturing and fracture problems.

Accordingly, it is an object of the present invention to provide an improved fluid-filled pressure transducer that is in particular adapted for making low pressure measurements such as those in the range of 250–1500 p.s.i. More particularly, the present invention carries out this low pressure measurement without requiring a large component design. In particular, the present invention permits low pressure measurements using the standard ½ inch - 20 threaded snout.

Another object of the present invention is to provide an improved low-range melt pressure transducer that is relatively simple in construction and that can be fabricated relatively inexpensively.

Still another object of the present invention is to provide an improved technique for constructing the sensing device.

A further object of the present invention is to provide an improved low-range melt pressure transducer that is constructed to reduce the tension forces across the element diaphragm to thus reduce non-linearity contributions of the diaphragm.

Another object of the present invention is to provide an improved low-range melt pressure transducer that is generally of the Eggleston, et al type having oppositely disposed formed indentations positioned alongside the raised beam; the indentations reducing the tension forces across the beamed diaphragm as the beam deflects allowing the beam to bend more freely and thus reduce the non-linearity contribution of the diaphragm.

SUMMARY OF THE INVENTION

To accomplish the foregoing and other objects, features and advantages of the invention, there is provided a pressure transducer, particularly for low pressure measurements and which comprises an elongated frame having means defining an elongated passage therethrough, a capillary tube extending through the frame and terminating at opposite ends of the frame and a coupler that closes one end of the frame and defines with the frame a chamber in communication with one end of the capillary tube. A liquid filled deformable sensor includes a cap member having an internal recess in a top wall. The recess defines a thin disc-shaped compartment at the other end of the frame which is in liquid communication with the other end of the capillary tube. A liquid fills the capillary tube, chamber and compartment for applying pressure exerted against the coupler to the sensor. The cap member has an outer top surface defined by a cap member top wall forming a thin diaphragm having a diametrically disposed raised beam extending across the top surface and having a gage receiving surface thereon. Strain gage means are attached to the gage receiving surface of the beam. There are provided a plurality of strain gages longitudinally disposed along the beam. There are preferably four of these gages, two for measuring compressive strains and two for measuring tensile strains. The beam preferably extends across the full width of the cap member and preferably has a constant width therealong. The beam may have flared ends. The thickness of the beam may be on the order of twice the thickness of the thin diaphragm wall.

In accordance with the invention, the cap member top surface has indentations therein on either side of and extending longitudinally of the raised beam. These adjacently disposed indentations function to reduce the tension forces across the diaphragm as the beam deflects thus allowing the beam to bend more freely. This enhanced free movement of the beam reduces the non-linearity contribution of the overall deflecting beam diaphragm.

In accordance with the method of construction of the present invention, it has been found that in constructing the beam, one can begin with a flat diaphragm surface such as described in the Eggleston, et al patent and simply remove the surface in a controlled manner so as to define the beam. It has been found that the removal or cutting of a portion of the top wall of the cap member is preferably carried out so as to provide a beam of a thickness approximately twice that of the adjacent thin wall. It has furthermore been found that by starting with a cap of range R, once the beam is formed, the range of the device has then been altered to have a range of R/4. The longitudinally extending indentations are formed thereafter by stamping the relatively thin flat top surface of the cap member adjacent and on either side of the raised beam. In a preferred embodiment of the invention the indentations are stamped from the outside. However, in an alternate embodiment of the invention, the indentations may be stamped from the inside of the cap member.

BRIEF DESCRIPTION OF THE DRAWINGS

Numerous other objects, features and advantages of the invention should now become apparent upon a reading of the following detailed description taken in conjunction with the accompanying drawing, in which:

FIG. 1 is a cross-sectional view of one form of fluid-filled pressure transducer constructed in accordance with the principles of the present invention;

FIG. 2 is a perspective view of the sensing element illustrated in FIG. 1;

FIG. 3 is a somewhat enlarged cross-sectional view of the sensing element also illustrated in FIG. 1 as taken along line 3—3 of FIG. 1;

FIG. 4 is a cross-sectional view taken along line 4—4 of FIG. 3 showing the beam and oppositely disposed indentations;

FIG. 5 is a cross-sectional view similar to that of FIG. 4 but with the diaphragm in a stressed position;

FIG. 6 is a cross-sectional view taken along line 6—6 of FIG. 5 with the diaphragm in its stressed position;

FIG. 7 is a plan view of the cap member in accordance with the present invention forming the deflectable diaphragm and also illustrating the beam and adjacently disposed indentations;

DETAILED DESCRIPTION

Figure 8:
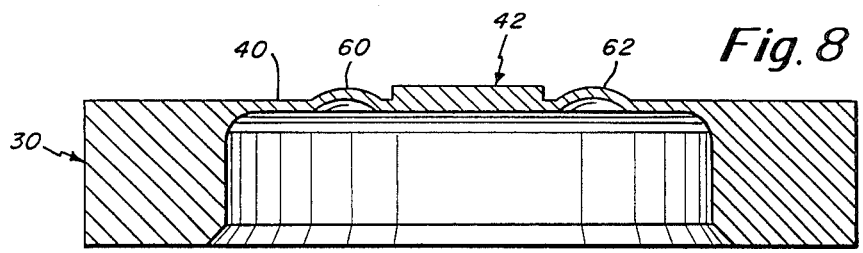
FIG. 8 is a cross-sectional view similar to the view of FIG. 4 but for an alternate embodiment of the invention in which the indentations are formed from inside the cap member.

Reference is now made to the drawings and in particular to FIG. 1 which is a cross-sectional view of a pressure transducer in accordance with the invention including a main frame 10, a sensing element 12 provided at the top end of the frame, a capillary tube 14 which extends through the frame, and a diaphragm coupler 16 secured to an enclosing the bottom end of the frame. The lower section of the frame 10 may be constructed in a similar manner to the construction illustrated in U.S. Pat. 3,678,753. Basically, there is an elongated passage 18 that extends through the main frame and which is for accommodating the capillary tube 14. The capillary tube 14 at its bottom end terminates at a relatively small chamber 20 which is closed by the diaphragm 16.

At the top end of the frame 10 there is included as part of the frame a top piece 22 through which the capillary tube 14 extends. The top piece 22 is for supporting the sensing element 12 in the position illustrated in the drawing. The sensing element 12 may be secured in position within the top piece 22 by being welded to the top piece.

In FIG. 1 the sensing element 12 is illustrated as comprising a base 26 and a cap member 30. The cap member 30 is welded to the base 26 and there is defined therebetween a thin disc-shaped compartment 32. FIG. 1 also illustrates the fill tube 34 and associated fill plug 36. The fill tube 32 communicates to the thin disc-shaped compartment 32. The liquid fill within the device including the fill within the chamber 20, compartment 32 and capillary tube 14, is introduced through the fill tube 34 under pressure so that all areas are completely filled with the mercury. The tube 34 is then capped off by the plug 36.

Reference is now made to FIGS. 2—7 which show further details of the sensing element 12. As indicated previously, the sensing element 12 includes a base 26, and a cap member 30. The cap member 30 is welded to the base 26 such as illustrated in FIGS. 3 and 4 at the weld 35. In this connection also note FIG. 2 that shows the annular weld line at 35. FIG. 3 shows the thin disc-shaped compartment, as does FIG. 4. It is noted also in FIGS. 3 and 4 that the top end of the capillary tube is illustrated as terminating directly at the thin disc-shaped compartment 32. FIGS. 3 and 4 also illustrate a weld at 37 where the top of the capillary tube 14 is welded to the very top surface 33 of the base 26.

Now, the cap member 30 has an outer top surface defined by a cap member top wall 40 forming a thin diaphragm. Integral with the wall 40 is a diametrically disposed raised beam 42 that extends across the top surface and has an upper gage receiving surface 44. The diaphragm functions as a force-collector of internal pressure to increase the force carried by the beam. This allows the beam to be thicker and to thus display proper linearity as described hereinafter in connection with FIG. 11.

The sensing diaphragm that is formed by the cap member with the beam 30 provides a structure that is in particular operable over lower pressure ranges such as ranges of 250, 500, 750, 1000, and 1500 p.s.i. This construction tends to reduce the stiffness of the diaphragm 40 permitting the beam section thereof to be thicker than a flat diaphragm of the same range. For example, for a range of 750 p.s.i. the thickness of the beam may be 0.0177 inch while, the thickness of a flat diaphragm for the same pressure range would have to be 0.0100 inch which is too thin and susceptible to fracture and non linearity. In this regard, reference will also be made hereinafter to Table I.

Reference is also now made to FIG. 4 which illustrates the cap member 30. In FIG. 4 it is noted that there are provided the dimensions T1 and T2. The dimension T1 is the thickness of the beam 42 while the dimension T2 is the thickness of the diaphragm 40. It has been found that the interrelationship between these dimensions preferably falls within a certain range. It is desired to have the diaphragm 40 thickness as thin as possible, but this cannot be made too thin or fracture problems occur. The thickness of the beam 32 is preferably as thick as possible, but if it becomes too thick, sensitivity of the device is lost. It has been found that the ratio of T1/T2 should preferably be on the order of 2.0. This is illustrated in FIG. 4, in which it is noted that the cut away portion removes the original cap member construction, which was originally totally flat on the top, to an essentially one-half depth so that the thickness of the diaphragm 40 is approximately one-half of the thickness of the beam 42.

With regard to the dimensions T1 and T2, reference is also now made to Table I which is set forth herein.

| PT NO. | RANGE PSI | T₁DIM | T₂DIM |
|--------|-----------|-------------|-------------|
| 422770 | 250  | .0104/.0099 | .0050/.0044 |
| 422771 | 500  | .0147/.0142 | .0060/.0053 |
| 422772 | 750  | .0177/.0172 | .0088/.0078 |
| 422773 | 1000 | .0226/.0220 | .0110/.0100 |
| 422774 | 1500 | .0265/.0255 | .0142/.0128 |

By way of example, for the pressure range of 250 p.s.i., the dimension T1 is in the range of 0.0099/0.0104 inch. The dimension T2 is in the range of 0.0044/0.0050. Taking the mean for each range, this would provide a ratio of T1/T2 of 2.18.

In another example, for the range of 1000 p.s.i., the dimension T1 is in the range of 0.0220/0.0226. The dimension T2 is in the range of 0.0100/0.0110. Again, taking the mean for each dimension, this provides a ratio of T1/T2 of 1.92. The range of the ratio of T1/T2 is preferably from 1.5 to 4.0.

As indicated previously, the beam 42 has an upper gage receive surface 44. In this regard, note FIGS. 2, 3, 6, and 7 that illustrate four strain gages G1–G4. Each of these strain gages may be of conventional design and may be of "D" alloy foil material type. The gage resistance is 350 ohms. With regard to the placement of the strain gages, reference is now made to FIG. 9 which shows these four gages disposed along the beam 42 of the cap member 30. The gages G1 and G4 measure compression while the gages G2 an G3 measure tension. Thus, the gages G1 and G4 measure negative-induced strain while the gages G2 and G3 measure positive-induced strain. It is noted that the gages G2 and G3 are spaced closely together symmetrical about the center of the cap member. The gages G1 and G4 are disposed longitudinally in line with the gages G2 and G3. The gage G1 is spaced from the gage G2 and the gage G4 is spaced from the gage G3 as noted in FIG. 9.

Figure 10:
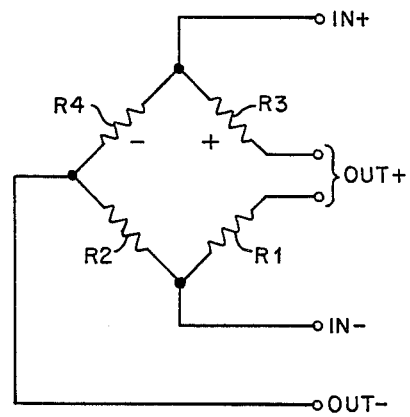
FIG. 10 is a schematic diaphragm illustrating the strain gage circuit of FIG. 9.

The gages G1–G4 are connected in a circuit as illustrated in FIG. 10. In FIG. 10 the resistors R1–R4 correspond, respectively, to the gages G1–G4.

Figure 9:
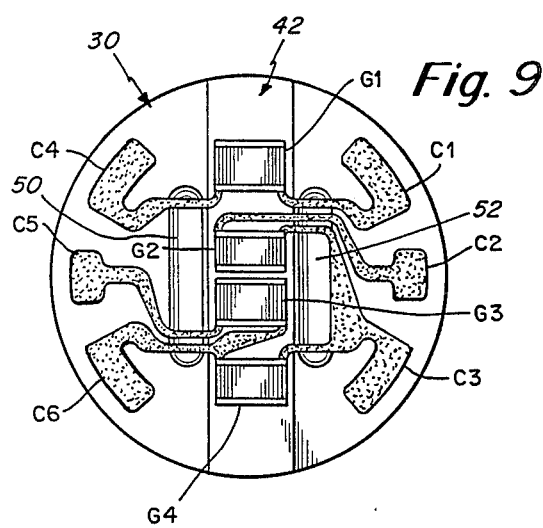
FIG. 9 is a diaphragm that is a plan view of the sensing element showing strain gage position and wiring terminals.

In FIG. 9, the gages G1–G4 are interconnected in a manner corresponding to the circuit of FIG. 10. In this connection, there are provided conductive contacts C1–C3 on one side of the beam 42 and contacts C4–C6 on the other side of the beam 42. Conductive runs interconnect the strain gages to the electrical contacts C1–C6. Again, the interconnections form a circuit as illustrated in FIG. 10.

FIG. 10 shows the gages as connected in a bridge construction having a pair of input terminals connected at one side of the bridge and a pair of output terminals taken from the other side of the bridge. An input signal would be applied across the input terminals and a pressure responsive voltage is measured across the output terminals.

In accordance with the present invention, there is associated with the cap member 30, and in particular at the cap member top wall 40, indentations on either side of an extending longitudinally of the raised beam 42. In this regard, refer to FIGS. 2–5 along with FIG. 7 for an illustration of the longitudinally extending indentations 50 and 52. FIG. 3 illustrates the elongated nature of these indentations. FIGS. 2 and 7 also illustrate the indentations and the extent of the length thereof. These indentations extend the major length of the beam portion that overlies the disc-shaped compartment 32. Note FIG. 3 in this regard.

The cross-sectional view of FIG. 4 illustrates the beamed diaphragm in its non-stressed position. On the other hand, the view of FIG. 5 illustrates the beamed diaphragm with a pressure applied thereto from the liquid medium as illustrated by the arrow 54. This causes a deflection of the beamed diaphragm. As illustrated in FIG. 5, because of these curved indentations, there is provided some amount of the flexure to the wall 40 enabling the web wall 40 to expand or contract without creating tension forces across the diaphragm. These indentations reduce the tension forces across the diaphragm as the beam deflects allowing the beam to thus bend more freely. This, in turn, reduces the non-linearity contribution of the diaphragm in the overall sensing scheme.

While a preferred embodiment of the present invention is illustrated in FIG. 5. An alternate embodiment of the invention is illustrated in FIG. 8. FIG. 8 differs from the embodiment of FIGS. 4 and 5 in that the indentations, identified in FIG. 8 as indentations 60 and 62, are formed from the inside of the cap member 30. Thus, these indentations actually extend outwardly as far as the outer surface of the diaphragm is concerned. However, these indentations also provide a flexure area that prevents the web (wall 40) from going into tension. If the wall 40 goes into tension, there is a non-linearity obtained, which is a function of this tension. Thus, by providing a flexure area in the form of an indentation or the like, then the web can expand or contract without generating any tension forces in the web or wall 40.

In either of the embodiments described herein, it is preferred that the indentations be elongated, be in the form of a single continuous indentation on each side of the beam, and furthermore it is preferred that the indentations be closely adjacent to the beam. This is clearly illustrated in FIGS. 4 and 8 in which both forms of indentations commence substantially just adjacent to the sides of the beam. In this regard, also refer to the position of the indentations from a plan view such as illustrated in FIGS. 7 and 9.

Figure 11:
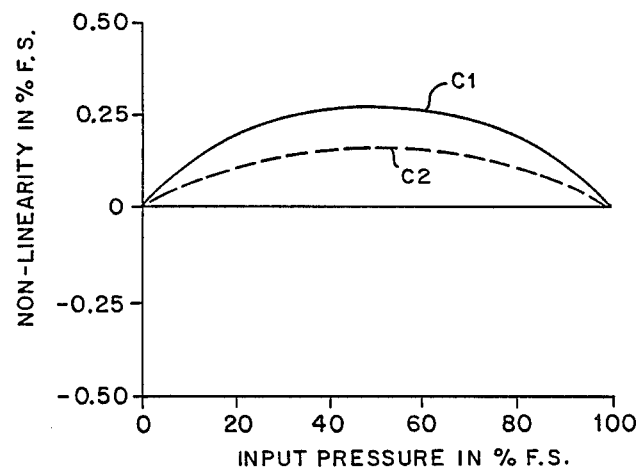
FIG. 11 is a input pressure versus non-linearity, illustrating the improved linearity that is provided with the transducer of this invention.

Reference is now made to FIG. 11 which is a diagram of input pressure in percent of full scale versus non-linearity in percent of full scale. There are two curves illustrated in FIG. 11, namely curves C1 and C2. Curve C1 shows a standard flat diaphragm and it is noted that there is typically a substantial non-linearity in operation. The curve C2 represents the construction of the present invention. It is noted in the curve C2 that this deviates only a small amount from the desired linearity (zero access).

With regard to the coupler diaphragm 16, it is preferred that this be in the form of a a substantially thick flat machined coupler diaphragm. The thicker machined diaphragm, in comparison with an older version employing a thinner formed and welded diaphragm, is more rugged and presents a flat surface to the measuring media. A thicker diaphragm is possible because of reduced displacement due to the use of the mercury fill.

When the transducer described herein is used in a temperature range having a maximum of about 750° F., mercury is the preferred fluid to fill the device. Mercury has a low compressibility and a boiling point in excess of 700° F., so that within that operative range, no vapor pressures are generated to cause secondary expansion of the chamber 32 to distort the wall 40 and beam 42 of the cap member 30. An alternative fill that may be used with with the device of the present invention is one of sodium-potassium referred to as a NaK fill. This of course also is in liquid form.

From the foregoing description, those skilled in the art will appreciate that numerous modifications may be made to this invention without departing from its spirit. Therefore, it is not intended to limit the breadth of this invention to the embodiments illustrated and described. Rather, it is intended that the breadth of this invention be determined by the appended claims.

What is claimed is:

1. A pressure transducer particularly for low pressure measurement comprising,
   an elongated frame having means defining a passage, a flat surface at one end thereof, and mating means adjacent to the flat surface,
   a capillary tube extending through the frame and terminating at one end adjacent another end of the frame,
   a coupler closing the other end of the frame and defining with the frame a chamber in communication with the capillary tube,
   a liquid filled deformable sensor including a cap member having an internal recess therein and mating means adjacent thereto for connecting with the mating means of the frame, said recess and flat surface defining a thin disc-shaped compartment in communication with another end of the capillary tube,
   and a liquid filling the capillary tube, chamber and compartment for applying the pressure exerted against the coupler to the sensor,
   said cap member having an outer substantially flat top wall having a diametrically disposed raised beam extending across its top surface and defining a gage receiving surface,
   said cap member top wall having indentations therein on either side of an extending longitudinally of said raised beam.

2. A pressure transducer according to claim 1 further characterized by said cap member defining a thin deflectable wall defining said recess and one side of said compartment, and said frame includes an upward extending portion defining the flat surface and another side of said compartment.

3. A pressure transducer according to claim 1 further comprising strain gage windings bonded to the top surface of said beam to measure the pressure applied to the wall by the liquid.

4. A pressure transducer according to claim 3 wherein four active strain gage windings are arranged in a bridge network.

5. A pressure transducer according to claim 1 wherein said coupler comprises a soft flexible diaphragm.

6. A pressure transducer according to claim 1 wherein said liquid is mercury.

7. A pressure transducer according to claim 1 including strain gage means attached to the gage receiving surface of the beam.

8. A pressure transducer according to claim 7 including a plurality of gage means longitudinally disposed along the beam.

9. A pressure transducer according to claim 8 including four strain gages, two measuring compressive strains and two measuring tensile strains.

10. A pressure transducer according to claim 1 wherein the beam extends across the full width of the cap member.

11. A pressure transducer according to claim 1 wherein the beam has a constant width across the cap member.

12. A pressure transducer according to claim 1 wherein the cap member top surface is defined by a cap member top wall forming a thin diaphragm with sections thereof disposed on opposite sides of the beam.

13. A pressure transducer according to claim 12 wherein the thickness of the beam is at least on the order of twice the thickness of the thin diaphragm wall.

14. A pressure transducer according to claim 1 wherein said indentations are formed on the top of the cap member top wall.

15. A pressure transducer according to claim 1 wherein said indentations are formed on the bottom surface of the cap member top wall.

16. A pressure transducer according to claim 1 wherein each of the indentations extends longitudinally along the beam just adjacent thereto.

17. A pressure transducer according to claim 16 wherein each of the indentations is continuous and extends along a major length of the beam.

18. A pressure transducer, particularly for low pressure measurement, comprising;
   an elongated frame having means defining an elongated passage therethrough,
   a capillary tube extending through the frame passage and terminating at opposite ends of the frame,
   a coupler closing one end of the frame and defining with the frame a chamber in communication with one end of the capillary tube,
   a liquid filled deformable sensor including a cap member having an internal recess and a top wall, said recess defining a thin disc-shaped compartment at the other end of the frame and in liquid communication with the other end of the capillary tube,
   and a liquid filling the capillary tube, chamber and compartment for applying the pressure exerted against the coupler to the sensor,
   said cap member having an outer top surface defined by a cap member top wall forming a thin diaphragm having a diametrically disposed raised beam extending across said top surface and having a gage receiving surface,
   said cap member top wall having indentations therein on either side of and extending longitudinally of said raised beam.

19. A pressure transducer as set forth in claim 18 including strain gage means attached to the gage receiving surface of the beam.

20. A pressure transducer as set forth in claim 19 including a plurality of gage means longitudinally disposed along the beam.

21. A pressure transducer as set forth in claim 20 including four strain gages, two measuring compressor strains, and two measuring tensile strains.

22. A pressure transducer as set forth in claim 18 wherein the beam has a constant width across the cap member.

23. A pressure transducer as set forth in claim 18 wherein the cap member top surface is defined by a cap member top wall forming a thin diaphragm with sections thereof disposed on opposite sides of the beam.

24. In a pressure transducer, particularly for measuring low pressures, and including a sensing element intercoupling via a capillary tube to a coupler, said sensing element including a cap member having an outer top surface defined by a cap member top wall forming a diaphragm, a method of forming a diametrically disposed raised beam extending across the top surface and having a gage receiving surface, comprising the steps of removing oppositely disposed segments of the cap member top wall to leave the diaphragm thickness on the order of one-half of the full top wall thickness, providing indentations in the cap member top wall extending longitudinally and on either side of the formed raised beam.

25. A method as set forth in claim 24 wherein the indentations are formed on the top surface of the top wall of the cap member.

26. A method as set forth in claim 24 wherein the indentations are formed on the bottom surface of the top wall of the cap member.

27. A diaphragm for a pressure transducer in which the pressure transducer is liquid filled and in which the diaphragm is adapted to have liquid pressure directed thereto, the improvement of said diaphragm having an outer surface that is substantially flat having a diametrically disposed raised beam extending across said top surface and defining a gauge receiving surface, a pair of indentations in said diaphragm on either side of and extending longitudinally of said raised beam.

28. A diaphragm as set forth in claim 27 wherein the indentations extend from one end to the other of the liquid sensing compartment and are disposed closely adjacent said beam.

* * * * *